Patented Oct. 9, 1951

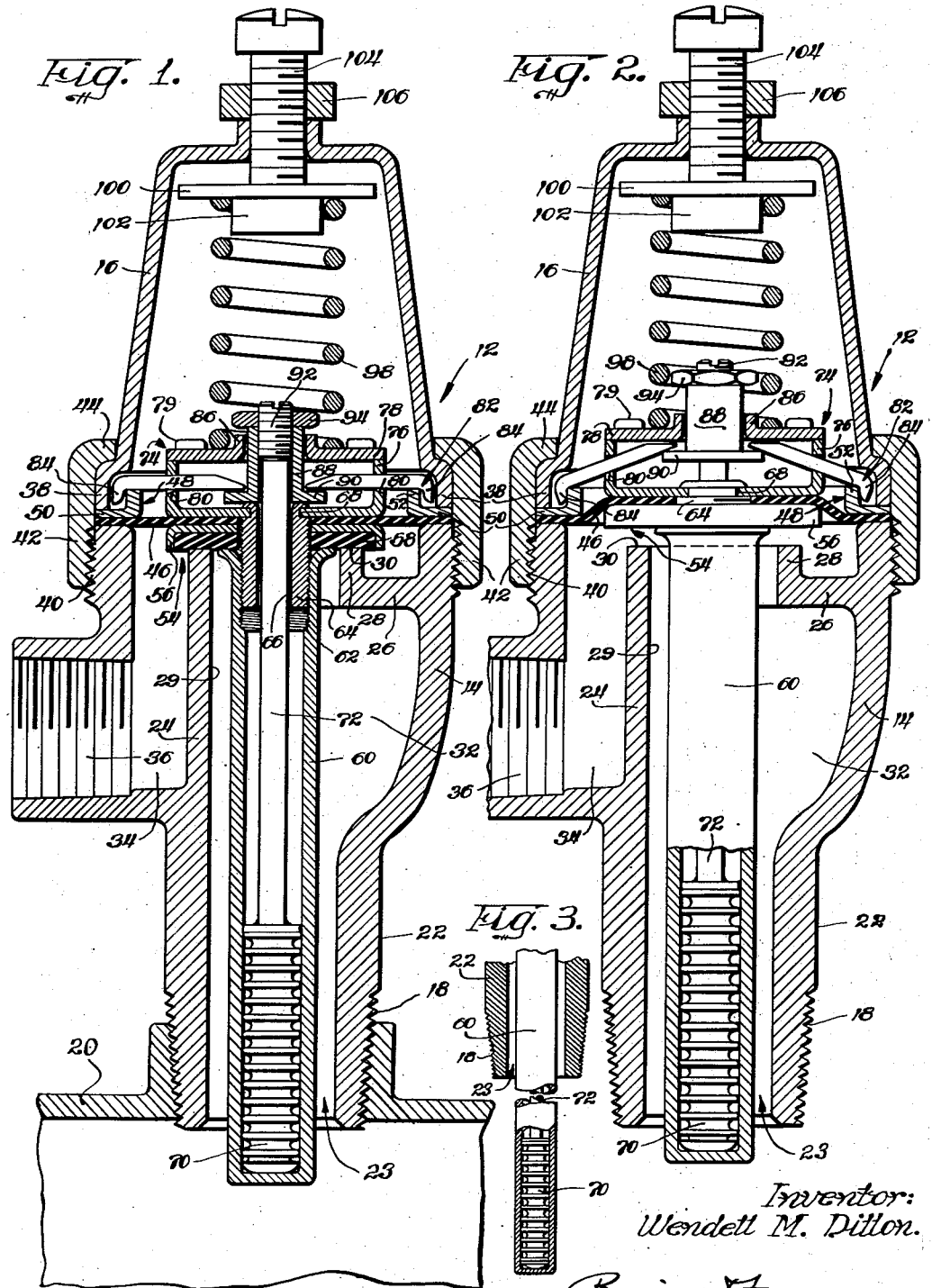

2,570,432

UNITED STATES PATENT OFFICE 2,570,432

PRESSURE AND TEMPERATURE RELIEF VALVE

Wendell M. Dillon, North Andover, Mass., assignor to Watts Regulator Company, Lawrence, Mass., a corporation of Massachusetts Application March 5, 1949, Serial No. 79,781

10 Claims. (Cl. 236—92)

This invention relates to a pressure and temperature relief valve which, when used in a water (or fluid) system, relieves the system upon the occurrence of either excess pressure or excess temperature in the system.

Most previously known valves of this general nature were subject to the objection that many if not all of the operating parts of the valves were exposed to the water in the system in which they were used, resulting in serious corrosion of those parts; as a consequence of the corrosion, the operating parts ceased operating as freely as desired, and the valves accordingly became inefficient.

An object of the present invention therefore is the provision of a valve which overcomes the above objection.

Another object is the provision of a valve in which all of the operating parts are sealed against the water in the system in which it is used.

Another object is the provision of a valve in which, because of the absence of corrosion of the operating parts, there is no necessity for compensating for thermal lag.

Still another object is the provision of a valve of the character referred to having a thermostat, in which the thermostat is not affected by temperature variations ambient to the valve itself, but is affected only by the temperature of the water in the system in which it is used.

A further object is the provision of a valve having a valve seat, a closure element for the valve seat, and a thermostat for opening the closure element, in which the thermostat is mounted on and carried by the closure element, and which includes novel operating elements to enable the thermostat to be carried by the closure element.

An objection to previous valves had to do with the nature of the valves—the thermostat must of course be subjected to the heat of the water in the system in which the valve is used, and the closure member must be movable; in order for the thermostat to be effective, it must react between the closure member and a fixed element, such as the valve housing. In view of the movability of the closure member, it has not been possible, heretofore, to seal the thermostat against the water in the system because if a seal were provided it would not be practicable to seal the thermostat with respect to the closure member.

A more specific object, therefore, of the invention is the provision of a valve having a diaphragm sealing all of the operating parts against the water in the system, including a thermostat which is located effectively on the side of the diaphragm opposite the water, but subjected to the heat of the water; because of the fact that the thermostat is so located, its action is reversed, and special operating parts are provided for converting the action of the thermostat in the proper direction for operating the closure member.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is an axial sectional view of a valve embodying my invention;

Figure 2 is a view similar to Figure 1 but with the valve in open position; and

Figure 3 is a reduced scale partial view illustrating the thermostat element extended beyond the valve body.

Referring now in detail to the drawings and particularly Figures 1 and 2, the valve includes a housing designated generally at 12 having a lower part 14 and an upper part 16. This specification refers to the valve as being vertical and having a lower part and upper part but it will be understood that these expressions are to be interpreted according to the position in which the valve is used. The lower part 14 is provided with a threaded extremity 18 adapted to be threaded into a tank or boiler in a water system in which the valve is to be used. The tank or boiler is indicated at 20 and is provided with a tapped opening for reception of the valve body.

The lower portion of the lower part 14 is tubular in form as indicated at 22, forming an inlet port 23. The main portion of the lower part 14 is provided with a vertical transverse wall 24 and a horizontal portion 26 terminating in a vertically extending tubular element 28 forming a port 29 and having a valve seat 30. The wall elements 24, 26 and 28 form an inlet chamber 32 and an outlet chamber 34. The inlet chamber 32 of course communicates with the tank or boiler 20 through the inlet port 23, and the outlet chamber 34 is provided with a threaded outlet port 36.

The upper part 16 of the valve housing is in the shape of a hood or bonnet and as here illustrated is closed for shielding the various ports from atmosphere, but the operation of the valve does not depend directly upon its being closed as will be apparent from the following description: The lower end of the upper part 16 is provided with a peripheral offset portion 38 adapted to cooperate with the upper edge of the bottom part 14 with certain elements clamped therebetween as will be referred to later. The bottom part 14 is threaded as indicated at 40 for receiving a ring or collar 42. The ring 42 has an inturned flange 44 at its upper end for engaging the offset portion 38 and thereby clamping the two parts of the valve housing together.

A flexible diaphragm 46 is one of the elements clamped between the valve parts. The diaphragm 46 may be any desired rubber or rubber product commonly used in valves of this general nature. The diaphragm 46 has its marginal edge clamped between the parts of the valve housing and is provided with a central opening. A fulcrum ring 48 is the other element clamped between the parts of the valve housing. The fulcrum ring 48 includes a plane portion 50 which engages the upper surface of the margin of the diaphragm and is clamped by the upper part of the valve housing. The fulcrum ring 48 also includes an annular portion 52 extending upwardly and spaced radially inwardly slightly from the offset portion 38.

It will be noted that the diaphragm 46 is disposed slightly above the valve seat 30. Positioned on the under surface of the diaphragm is a valve closure member 54 which is made up of a cup shaped retainer 56 in which is inserted a resilient disk 58. The disk 58 is provided with a central opening and is of such size and so located as to engage and close the valve seat 30. The retainer 56 is provided with a threaded central opening.

A case indicated at 60 is mounted on the diaphragm 46 and related elements in a manner to be presently described. The case 60 is in the form of a tube having a closed bottom end and being otherwise entirely closed except for its open upper end. The upper end of the case 60 is in engagement with the resilient disk 58. The case 60 is preferably of metal and must be of good heat conducting qualities. The case 60 extends into and through the inlet chamber 32 and through the inlet port 23 in the tubular portion 22 down into the tank or boiler so as to be readily responsive to heat changes in the system and particularly in the tank or boiler.

The upper end of the case 60 is internally threaded as indicated at 62 to receive a threaded element 64 having a central bore 66. The element 64 extends upwardly through the central openings in the disk 58, retainer 56 and diaphragm 46. The upper end of the element 64 is provided with a peripheral groove 68.

A thermostat 70 is positioned in the case 60 at the lower end thereof. The thermostat 70 may be a bellows type as illustrated or it may be of any of a number of other conventional thermostats. The thermostat engages the lower end of the case 60 and is provided with a vertical stem 72 extending upwardly through the bore 66 and extends above the diaphragm 46.

A disk carrier is indicated at 74 and includes a cup shaped member 76 and a plate 78 enclosing the upper open side of the cup shaped member. The member 76 is provided with fingers or prongs 79 which are extended through slots in the plate 78 and turned down to hold the member 76 and plate 78 together. The bottom of the cup shaped member 76 is provided with a central opening; in the final assembly, the margin of the opening is received in the groove 68, this being accomplished by peening over the material forming the upper margin of the groove. The disk retainer 56 is threaded upwardly on the element 64 so as to clamp the diaphragm 46 firmly between itself and the disk carrier to form a rigid assembly.

The peripheral flange of the cup shaped element 76 is provided with a plurality of circumferentially spaced slots 80. A plurality of radial arms 82 are provided, the arms being positioned in respective ones of the slots 80. Each arm 82 has a downturned lug 84 at its outer end. The outer end of each arm bears on the annular flange 52 of the fulcrum ring 48 and the lug 84 extends down into the space between the flange and the offset portion 38. The arms being inserted through the slots 80 have bearing engagement intermediate their ends with the cup shaped disk carrier 76 and the inner ends approach the center and are free to move. Preferably, three such arms 82 are provided and are spaced equidistantly around the valve. It is understood however that a different number of arms may be employed.

The plate 78 has a central opening surrounded by a vertical flange 86. An element 88 which will be termed a stool, is slidably disposed in the opening defined by the flange 86. The stool 88 is tubular in form having internal threads and having a lower radial flange 90. The stool 88 is so disposed that the flange 90 is below the inner ends of the arms 82 and is adapted to engage the arms upon upward movement of the stool. A set screw 92 is threaded in the stool 88 from the upper end thereof and a lock nut 94 is provided for locking the set screw 92 in adjusted positions in the stool 88. The upper end of the stem 72 extends into the stool 88 and is adapted to engage the lower end of the set screw 92.

A relatively heavy compression spring 98 is disposed above the disk carrier 74, the lower end engaging the plate 78, and the upper end engaging a spring button 100. The spring button includes a central element 102 for retaining the upper end of the spring in position. The spring button is engaged by a set screw 104 threaded in a central opening in the upper end of the upper part 16 of the valve housing. A lock nut 106 is also provided on the set screw 104.

Figure 3 illustrates the case 60, and thermostat element 70 therein, extended a considerable distance below the lower end of the tubular portion 22. The purpose of such an arrangement will be brought out in the description of the operation.

*Operation*

As mentioned above the valve of the present invention is a pressure and temperature relief valve. The spring 98 biases downwardly on the plate 78 and thereby moves the disk 58 down into closing position on the valve seat 30. Upon the build up of excess pressure in the tank 20, and thereby in the inlet chamber 32, the pressure lifts the disk 58 and all of the assembly thereabove, against the action of the spring 98, off of the valve seat 30. The water or steam then flows through the port 29 into the outer chamber 34 and out the outlet opening 36. Upon the relief of such pressure the spring 98 again biases the closure member back into position closing the valve seat. The set screw 104 can be adjusted for determining the pressure at which the system will be relieved.

As to temperature relief, the operation is as follows: The heat in the tank or boiler and in the inlet chamber 32 is conducted through the casing 60 and expands the thermostat 70. The thermostat 70 then reacts between the case 60 and stem 72 biasing downwardly on the case and upwardly on the stem. The downward bias on the case 60 is transmitted through the element 64 and disk carrier 74. The upward bias on the stem 62 is exerted through the set screw 92 and stool 88. The stool 88 is then moved upwardly and the flange 90 engages the inner ends of the arms 82 and lifts upwardly on the latter. The outer ends of the arms 82 tend to lower and engage the fulcrum ring 48 and are arrested against such movement thereby. The points of engagement of the arms in the slots 80 form load points on the arms which act as levers. Then upon continued raising of the inner ends of the arms 82, the disk carrier 74 is lifted to the position shown in Figure 2 and since the case 60 is mounted on the assembly it is bodily moved upwardly with the assembly. There is no binding force in the assembly mounted on the diaphragm and the expanding movement of the thermostat is accommodated by the spreading action between the inner ends of the arms and the lower plate portion of the cup shaped member 76. It will be understood that the diaphragm 46 does not in itself take part in the operating movements of the valve and the purpose of the diaphragm is to seal the bottom part of the valve against the passage of water and steam to the upper part.

The set screw 92 may be adjusted up or down for setting the point at which the valve will open by temperature.

For purposes of interpreting the claims, the disk retainer 56 and disk carrier 74 together may be referred to as a closure member. The closure member is thus effectively mounted at its peripheral margin in the valve housing by means of the arms 82. The closure member thus comprises movable parts, namely, the arms 82 and the disk carrier and assembly. By reason of spreading these parts relatively, the whole assembly or closure member is lifted off of the valve seat.

One of the most important features of the present invention is now believed evident. The thermostat as well as all of the remaining operating parts of the valve are entirely sealed from corrosive action of the water or fluid in the valve. The thermostat 70 is entirely sealed in the case 60 and extends through the diaphragm to the side thereof opposite the valve seat 30 and port. The case 60 is also fitted against the resilient disk 58 and thereby sealed from the lower part of the valve.

As brought out in the introduction, the thermostat must of course be thermally subject to the heat in the inlet chamber (and the system) so as to be subject to heat variations therein. In the present case that is accomplished. However, due to the complete sealing feature of the diaphragm and the pertinent parts, the thermostat is sealed against the lower part of the valve and is, for that reason, effectively located in the upper part of the valve, or in other words on that side of the diaphragm opposite the water to which it is subjected. Because of this arrangement of the thermostat, the action of the thermostat would normally be the reverse of that intended, namely, it would tend to close the closure member upon excess temperature and open the closure member upon drop of that temperature but because of the novel arrangement of operating parts, I have effected proper operation of the closure member while at the same time having a thermostat and all operating parts sealed on the side of the diaphragm opposite the water, or the system. In order to bring out the significance of the feature just referred to, comparison may be made with that type of valve having a thermostat operating against the closure member and against a fixed point such as the valve housing. The thermostat must be located (thermally) in the intake chamber of the valve. An exposed thermostat in such a position would become corroded and thereby inefficient. If it is attempted to seal a thermostat in such a position there would of necessity be a connection between the seal and the closure member. However, since the closure member must move, the connection would have to be sliding and this is impractical.

Another important feature of the invention requires repetition of the fact that the thermostat must be thermally subject to the heat in the system in which the valve is used. The illustrations of Figures 1 and 2 indicate that the valve is mounted directly on the tank 20, as is ordinarily the case. In such a case, the case 60 and thermostat 70 are disposed mainly in the inlet chamber 32 and tubular portion 22, with the lower end extending directly into the tank. The temperature in the tubular portion 22 and inlet chamber 32 is substantially the same as that in the tank, because of the proximity of the parts, and there is no appreciable thermal lag in the operation of valve parts.

If, however, the valve is to be located at a point more remote from the tank, the arrangement illustrated in Figure 3 is employed. The case 60, with the thermostat in the lower end, can be made of any length, so that at whatever position the valve is located, the case 60 can be extended into the tank, and the thermostat will be directly and immediately responsive to the temperature in the tank.

A comparison with previous types of valves is appropriate at this point. In many present day valve constructions, the thermo-sensitive element extends the length of the thermostat structure; and there is a difference in temperature in the tank and in the valve, when the valve is remote from the tank, with consequent thermal lag in the operation of the valve parts. For example, if the temperature in the valve were 180°, and that in the tank 212°, the valve would require a mean setting to open in that condition corresponding to the entire thermostat being immersed in water of probably 195°; then if the tank temperature were 200°, and water were drawn so that the water flowed by the thermostat, heating it for its entire length, the valve would open prematurely.

Such objection is overcome by the novel construction of the valve of the present invention. The thermostat is supported and carried by the closure element; and it has no connection with the lower part of the valve housing, with the result that the thermostat can readily be made of such length as to extend down into the tank from whatever position the valve is located. The thermostat will then be directly responsive only to the temperature in the tank. This would not be possible if the thermostat were anchored in the lower part of the valve housing.

In interpreting the claims herein it is intended that the thermostat is subject to the temperature in the system as well as the temperature in the inlet chamber of the valve.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a valve of the character disclosed, a valve housing having an inlet chamber and an outlet chamber, a valve seat between said chambers, a diaphragm sealed at its marginal edge to said housing, a closure member on said diaphragm, said diaphragm being flexible and adapted to carry said closure member to and from closing position with respect to said seat, a thermostat mounted on and movable with said diaphragm, said thermostat extending into and through said inlet chamber, a rigid member mounted on and carried by said diaphragm, and arms pivoted intermediate their ends on said rigid member, one end of said arms being in engagement with said housing, and said thermostat acting between the other end of said arms and said rigid member operative to move said rigid member and diaphragm and thereby move said closure member from said seat.

2. In a valve, a housing having an inlet chamber and an outlet chamber, a port communicating between said chambers, a flexible diaphragm having its marginal edge secured and sealed in said housing, a closure member for said port mounted on and secured to said diaphragm, a case carried by said diaphragm and extending into said inlet chamber, said case being sealed from said inlet chamber, thermo-responsive means in said case and extending through said diaphragm, a rigid member mounted on said diaphragm, and arms mounted on said rigid member and engaging said housing, said thermo-responsive means being adapted to react between said rigid member and arms and operable to move said rigid member and diaphragm and thereby move said closure member from said port.

3. In a valve, a housing having an inlet chamber and an outlet chamber, a port communicating between said chambers, a flexible diaphragm having its marginal edge secured and sealed in said housing, a port closure disk on said diaphragm, a disk carrier on the opposite side of said diaphragm, said disk and disk carrier being rigidly clamped together, a thermostat mounted on said diaphragm and extending into said inlet chamber, said thermostat extending through said disk and diaphragm and into said disk carrier, and a plurality of radial arms, the outer ends of said arms having bearing engagement with said housing, said arms having bearing support at points intermediate their ends in said disk carrier, and the inner ends of said arms being free for movement, said thermostat reacting between said disk carrier and the inner ends of said arms and operable to move said disk carrier and thereby said disk from said port.

4. In a valve of the character disclosed, a housing having a chamber and a port in said chamber, a flexible diaphragm having its marginal edge secured and sealed to said housing, a closure member secured to said diaphragm and movable therewith, said closure member having a resilient portion engageable with said port for closing the same, a disk carrier mounted on said diaphragm on the side thereof opposite said closure member, said closure member and disk carrier forming a rigid assembly with the diaphragm clamped therebetween, a case mounted on said closure member and extending into said chamber, said case having an open end in engagement with said resilient portion, the remainder of said case being closed, and the case being thereby sealed from said chamber, means securing said case to said closure member for bodily movement therewith, and thermostat means in said case, said thermostat means extending through said assembly and diaphragm, a plurality of radial arms, the outer ends of said arms having bearing engagement with said housing, said arms having bearing support at points intermediate their ends in said disk carrier, and the inner ends of said arms being free for movement, said thermostat reacting between said case and the inner ends of said arms and operable to move said assembly away from said port, and means reacting between said housing and assembly for biasing said assembly toward said port.

5. In a valve of the character disclosed, a housing having an upper and lower part, said lower part having an inlet chamber and an outlet chamber with a port and valve seat therebetween, means for securing said parts together, a flexible diaphragm having its marginal edge clamped between said parts, a fulcrum ring clamped between said parts, a disk carried by said diaphragm adapted to move into and out of closing position with respect to said seat, a disk carrier carried by said diaphragm on the side thereof opposite said disk, said disk carrier and disk forming a rigid assembly with the diaphragm clamped therebetween, thermostat means secured to said disk and bodily movable therewith, said thermostat extending into said inlet chamber and having a portion extending through said disk, diaphragm and disk carrier, and a plurality of radial arms, the outer ends of said arms having bearing engagement on said fulcrum ring, said arms having bearing engagement intermediate their ends in said disk carrier, the inner ends of said arms being free to move, said thermostat means reacting between said assembly and the inner ends of said arms and being operable to move said assembly away from said seat.

6. In a valve of the character disclosed, a housing having an upper and lower part, said lower part having an inlet chamber and an outlet chamber with a port and valve seat therebetween, means for securing said parts together, a flexible diaphragm having its marginal edge clamped between said parts, a fulcrum ring clamped between said parts, a disk carried by said diaphragm, said disk having a resilient portion adapted to close said seat, a disk carrier carried by said diaphragm on the side thereof opposite said disk, said disk carrier and disk forming a rigid assembly with the diaphragm clamped therebetween, a case mounted on said disk and extending into said inlet chamber, said case having an open end in engagement with said resilient portion, the remainder of said case being closed, and the case being thereby sealed from said inlet chamber, means securing said case to said disk for bodily movement therewith, and thermostat means in said case, said thermostat means extending through said assembly and diaphragm, a plurality of radial arms, the outer ends of said arms having bearing engagement on said fulcrum ring, said arms having bearing engagement intermediate their ends in said disk carrier, the inner ends of said arms being free to move, said thermostat means reacting between said assembly and the inner ends of said arms and being operable to move said assembly away from said seat and spring means reacting said housing and assembly biasing said assembly toward said seat.

7. In a valve, a housing having a chamber with a port and valve seat therein, a closure member movable toward and from said seat, a plurality of radial lever arms pivoted on said closure member, the points of engagement between said arms and said closure member being load points, the outer ends of said arms having fulcrum support on said housing, and thermostat means reacting between said closure member and force points on said arms, said thermostat means being responsive to heat changes in said chamber, said thermostat being operable to cause relative movement between said closure member and said force points and thereby cause fulcruming movement of said arms and move said closure member from said seat.

8. In a valve, a housing having a chamber with a port and valve seat therein, a closure member movable toward and from said seat, a plurality of radial lever arms pivoted on said closure member, the points of engagement between said arms and said closure member being load points, the outer ends of said arms having fulcrum support on said housing, thermostat means reacting between said closure member and force points on said arms, said thermostat means being responsive to heat changes in said chamber, said thermostat being operable to cause relative movement between said closure member and said force points and thereby cause fulcruming movement of said arms and move said closure member from said seat, and spring means reacting between said housing and closure member biasing said closure member toward said seat.

9. In a valve of the character disclosed, a valve housing having an inlet chamber and an outlet chamber, a valve seat between said chambers, a diaphragm sealed at its marginal edge to said housing, a closure member on said diaphragm, said diaphragm being flexible and adapted to carry said closure member to and from closing position with respect to said seat, a case mounted on and movable with said diaphragm extending through said valve seat and through said inlet chamber, said case being sealed to said inlet chamber, a thermostat in the extended end of said case, a rod connected to said thermostat and extending through said diaphragm, and operating means interconnecting said rod and closure member and reacting against the housing, said thermostat, on expansion thereof, acting through said rod and operating means and being thereby operable for lifting said closure member from said valve seat.

10. In a valve of the character disclosed, a valve housing having an inlet chamber and an outlet chamber, a valve seat between said chambers, a diaphragm sealed at its marginal edge to said housing, a closure member on said diaphragm, said diaphragm being flexible and adapted to carry said closure member to and from closing position with respect to said seat, a case mounted on and movable with said diaphragm extending through said valve seat and through said inlet chamber, said case being sealed to said inlet chamber, a thermostat in the extended end of said case, said thermostat being confined in the extended end of said case and thereby being responsive to heat in said inlet chamber uniformly and simultaneously throughout its extent, and operating means connected with said thermostat extending through said diaphragm and connected with said valve closure member and reacting against said housing, said thermostat, on expansion thereof, acting through said operating means and being thereby operable for lifting said closure member from said valve seat.

WENDELL M. DILLON.

REFERENCES CITED

The following references are of record in the file of this patent:

UNITED STATES PATENTS

| Number | Name | Date |
|---|---|---|
| 1,438,067 | Springer | Dec. 5, 1922 |
| 1,941,023 | Smith | Dec. 26, 1933 |
| 2,389,437 | Kmiecik | Nov. 20, 1945 |

FOREIGN PATENTS

| Number | Country | Date |
|---|---|---|
| 659,696 | France | Feb. 5, 1929 |